W. A. MAY.
ANIMAL TRAP.
APPLICATION FILED FEB. 21, 1912.
1,032,228.
Patented July 9, 1912.
2 SHEETS—SHEET 1.
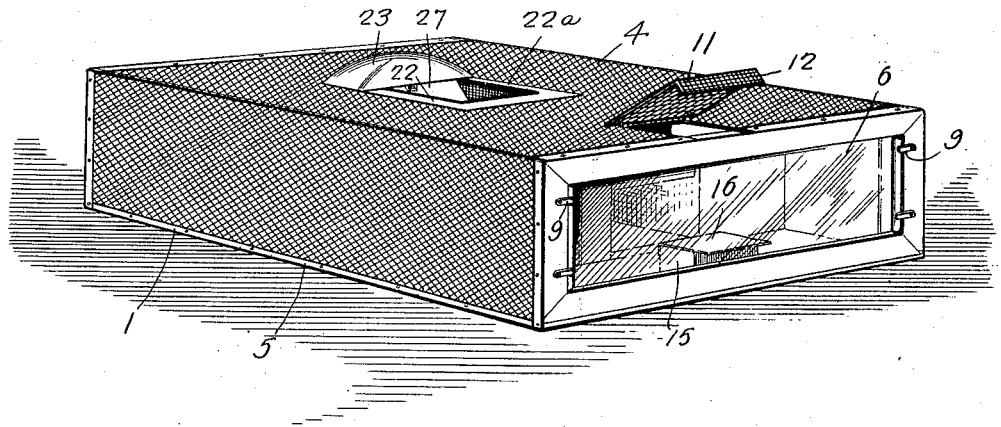
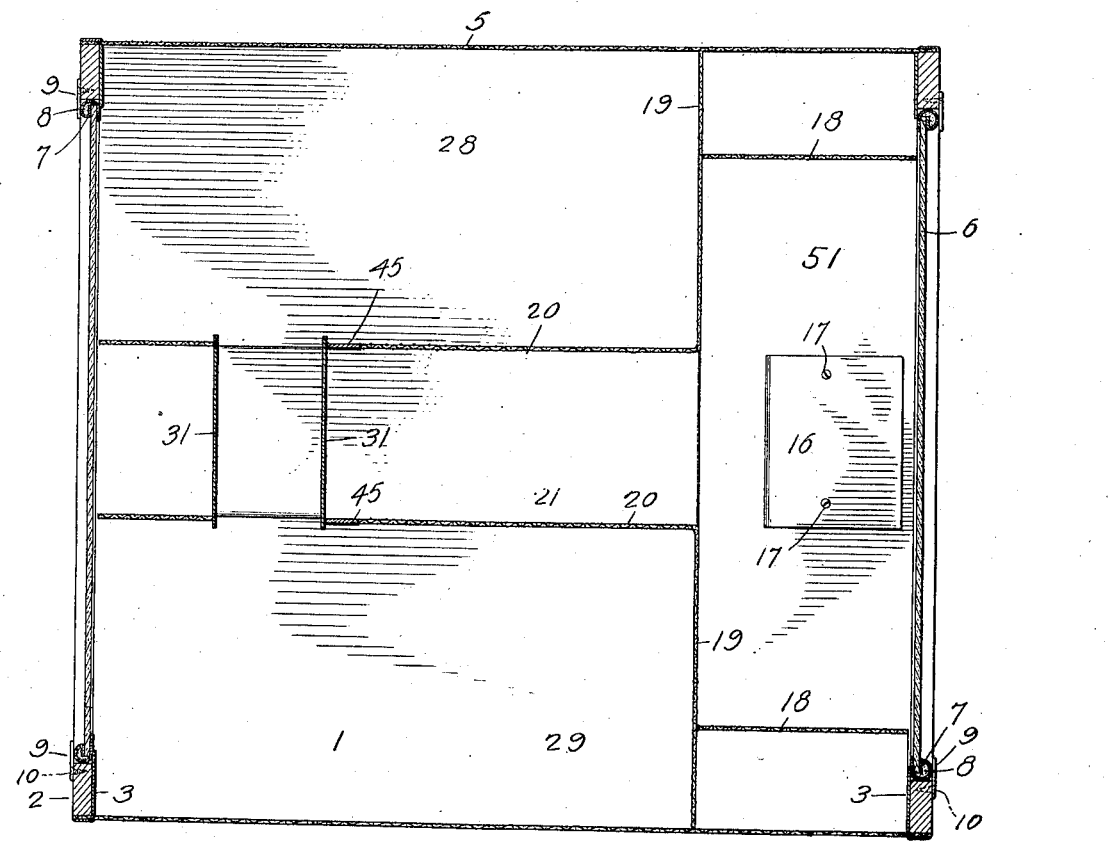
Fig. 2.
WITNESSES
INVENTOR
WILLIAM A. MAY,
BY Munn & Co.
ATTORNEYS

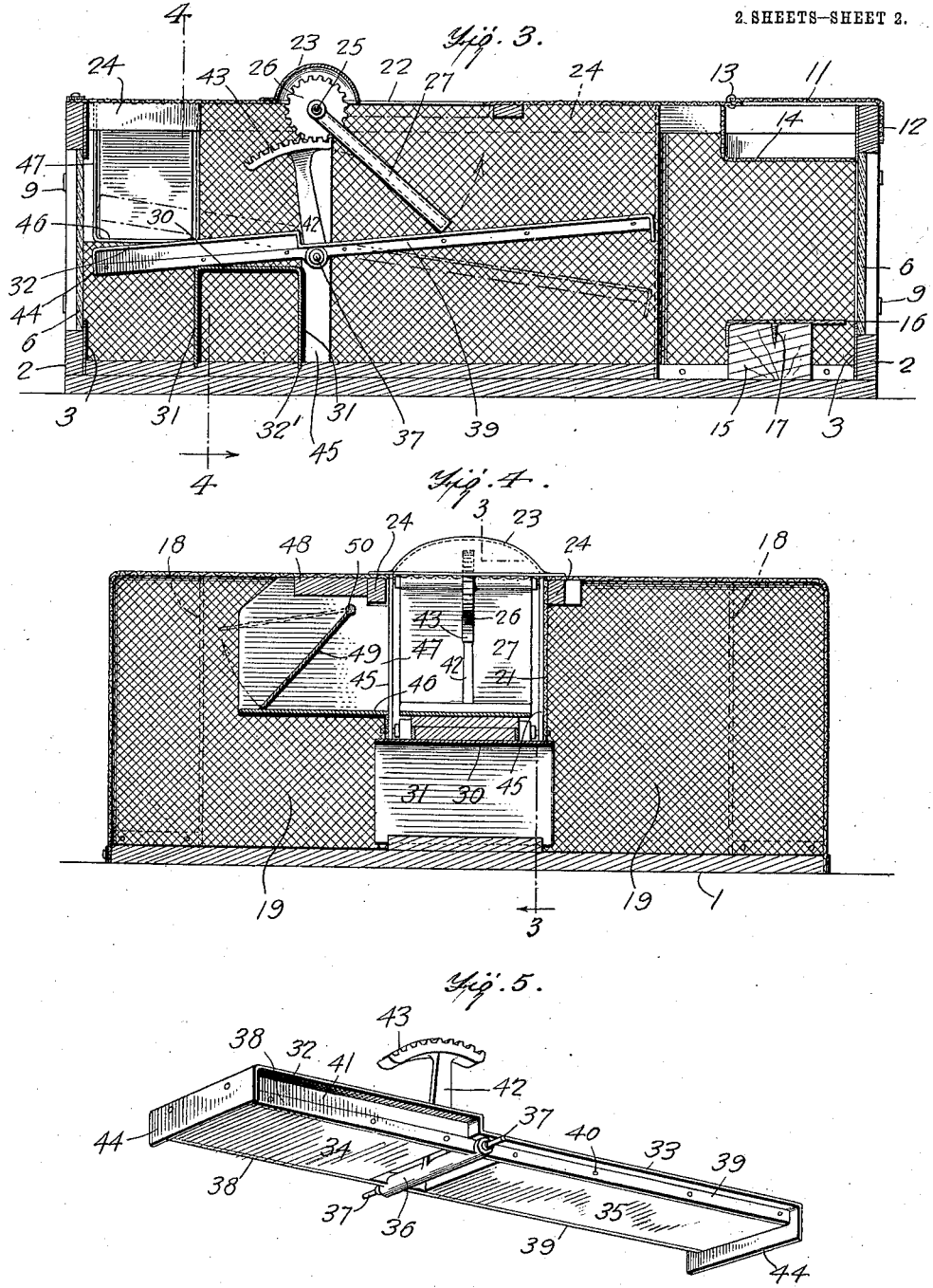
W. A. MAY.
ANIMAL TRAP.
APPLICATION FILED FEB. 21, 1912.
1,032,228.
Patented July 9, 1912.
2 SHEETS—SHEET 2.
WITNESSES
INVENTOR
WILLIAM A. MAY,
BY
ATTORNEYS

UNITED STATES PATENT OFFICE.

WILLIAM A. MAY, OF QUITMAN, GEORGIA.

ANIMAL-TRAP.

1,032,228.

Specification of Letters Patent. Patented July 9, 1912.

Application filed February 21, 1912. Serial No. 679,050.

*To all whom it may concern:*

Be it known that I, WILLIAM A. MAY, a citizen of the United States, and a resident of Quitman, in the county of Brooks and State of Georgia, have made certain new and useful Improvements in Animal-Traps, of which the following is a specification.

My invention is an improvement in animal traps, and has for its object the provision of a simple, inexpensive, easily cleaned mechanism of the character specified, wherein the entrance opening is normally open, and is closed by the entrance of the animal, and wherein other compartments are provided into which the animal may freely pass, but cannot return in order to permit the trap to automatically set itself.

Another object is to provide a trap which is self-setting and self baiting, and wherein the bait is always visible from the outside.

In the drawings Figure 1 is a perspective view of the trap, Fig. 2 is an enlarged horizontal section, Fig. 3 is a section on the line 3—3 of Fig. 4, Fig. 4 is a section on the line 4—4 of Fig. 3, and Fig. 5 is a perspective view of the swinging or balancing plate.

The present embodiment of the invention comprises a casing substantially rectangular in cross section, and having an imperforate bottom 1, of wood or the like. The ends of the casing are composed of open rectangular frames 2 of wood or like light material, preferably covered with sheet metal, as indicated at 3. The top 4 and sides 5 of the trap are composed of perforate material, as for instance wire gauze.

Each of the end frames is normally closed by a plate 6 of transparent material, as for instance glass, mica, or celluloid. Each plate 6 is provided at each end with a reinforcing bar 7, of sheet metal, bent into approximately tubular form, and having a longitudinal recess for receiving the end of the plate.

Each of the bars is filled with a filling 8 of plastic material, capable of hardening, as for instance putty, cement, or the like. The plates 6 are held in place in the frames, by means of latch bars 9, on the outer side, each bar being pivotally secured to the frame by a screw 10, so that the latch may be turned from over the plate to release the same.

The inner face of each end of each plate 6 abuts against the edge of the covering 3, which is extended to receive the plate. The plates may be removed, when desired, by turning the latch and drawing the plate outwardly. A door 11 is provided in the top 4 at one end, the door being of perforate material, hinged at its inner end 6 to the top, as shown at 13, and having a lateral flange 12 at its outer end fitting outside of the adjacent frame.

A receptacle 14 is arranged immediately below the door 11, the said door giving access to the receptacle. The receptacle is of perforate material and of rectangular cross section, and is slightly larger than the door. The receptacle is adapted to hold bait, which while visible from within the trap, is yet not accessible, and the bait may be inserted or removed from outside the trap.

A pedestal or platform 15 is secured to the bottom 1, directly below the receptacle, the said pedestal consisting of a block 15, to which is secured a plate 16 of sheet metal, by screws 17. A receptacle is also arranged at each side of the trap, at the end adjacent the receptacle. Each receptacle is of rectangular cross section, and extends the full depth of the casing.

The outer side and end walls of the receptacle are formed by the walls of the trap, and each receptacle has an inner side wall 18, of perforate material, the said wall being inside of the inner edge of the end of the adjacent frame so that the contents of the receptacle will be visible through the plate 6. The inner end wall of each receptacle is formed by a wall 19 of perforate material, and each wall 19 extends parallel with the plates 6 to approximately the adjacent end of the platform. The material of the wall is then bent at a right angle, to form a wall 20 extending longitudinally of the trap. The two walls 20 are parallel and are spaced apart from each other to form a passage 21, at the center of the trap, and extending from walls 19 to the opposite end of the trap.

An opening 22$^a$ is provided in the top of the trap, above the passage 21, and opening into the passage, and near the opposite end from the receptacle 14. A metal frame 22 is provided at the opening to which the edges of the top are secured. A housing 23 is provided at the end of the frame remote from the receptacle 14, and a bar 24 of wood or the like is arranged longitudinally of the casing at the outer side of each wall 21.

A shaft 25 is journaled transversely of the housing 23, and a pinion or gear wheel 26 is secured to the shaft at the center thereof. A platform 27 is secured at one end to the shaft, the said platform being directly below the opening 22ª, and of approximately the same area. The walls 20 in addition to forming the passage 21, form with the trap walls, two compartments 28 and 29, one on each side of the passage.

The compartments 28 and 29 are connected by means of a passageway, which is formed by a housing, substantially U-shaped in cross section, and having each end engaging an opening in the adjacent wall 20. The body 30 of the housing is upward, and the side walls or arms 31 extend downwardly approximately parallel, and the lower edge of each side wall is received in a groove 32' in the bottom 1 of the trap.

The passage formed by the housing 30—31 is on the opposite side of the opening 22ª from the receptacle 14, and offers a free passage for the animals from one compartment 28 or 29 to the other, transversely of the passage 21. A swinging platform is arranged longitudinally of passage 21, the said platform consisting of two portions 32 and 33 off-set laterally from each other.

The platform is supported by two alined blocks 34 and 35 of wood, spaced apart at their adjacent ends, on each side of a shaft 36, having a reduced journal pin 37 at each end. The shaft 36 is provided with pairs of oppositely extending alined arms 38 and 39, the arms 38 extending on opposite sides of the block 34, and the arms 39 on opposite sides of the block 35.

The arms are secured to the block by rivets or nails 40, and an additional block 41 is arranged on the upper face of the block 34, to provide for the upwardly offsetting of the portion 32 of the platform. An arm 42 extends radially upward from the center of the shaft 36, and a toothed sector 43 is provided at the upper end of the arm.

The sector gears with wheel 26, in such manner that when platform 27 moves in either direction, the adjacent end of platform 32—33 swings in the opposite direction. Shaft 36 is journaled almost directly between shaft 25, and the portion 33 of the platform 32—33 is below plate 27. Each end of platform 32—33 is flanged downwardly, as indicated at 44.

The outer ends of the platform are approximately flush with the ends of the passage 21, and the portion 33, while of greater length than the portion 32, is of equal weight, on account of the additional thickness of portion 32. The ends of shafts 27 and 36 are journaled in vertical bars 45, (Figs. 2 and 4) arranged on walls 20, at each end of one side of the housing 30—31.

Access may be had from passage 21, or rather from that portion of the passage above the platform 32—33, to compartment 28 by means of a housing, substantially U-shaped in cross section, and comprising a body 46 and upwardly extending sides or arms 47. The body is the floor of the passage and the sides or arms are secured to the ends of a block 48 arranged on the top, adjacent to block 24.

A door 49 is provided in the passage for preventing return to passage 21, and the said door is secured at its upper end to a shaft 50, where ends are journaled in the sides 47 of the housing 46—47. The shaft is at such height from the floor of the passage, that the door is in inclined position when closed, inclining downwardly and outwardly from the passage 21.

The door is of light weight, so that the animal can lift it to pass out of passage 21 into the compartment 28, but cannot lift the door to return. The upper face of portion 32 of the platform 32—33 is approximately flush or level with the floor of passage 46—47, when the platform is in the normal position of Fig. 3.

In operation, the trap is baited, by placing a suitable bait in the compartment 14, and in the side compartments formed by the walls 18 and 19. The animals can see the bait through the trap walls, and can also smell the same. They will naturally seek an inlet, and finding the opening 22ª will step down on the platform 27, onto the portion 33 of platform 32—33. As the said platform is balanced, the weight of the animal will depress the portion 33, and through the arm 42, gear 26 and sector 43, the platform or plate 27 will be lifted into the dotted line position of Fig. 3, thus closing the opening 22ª. The animal can now pass to either end of the passage 21, and can pass out into compartment 28, and then to compartment 29. It is more probable however, that it will enter the compartment 51, between the bait receptacles. When in this compartment the platform 32—33 returns to original position, but the animal cannot escape, since as soon as it steps on the platform the plate 27 is lifted to close the opening 22ª. The animal will finally reach compartments 28 and 29, thus leaving the trap set and ready for the next one. The animals may be killed in the trap and removed through either end frame. The removal of said frames permits access to every part of the trap for cleaning or repairs.

I claim:

1. A trap comprising a floor, an open rectangular frame at each end of the floor, a plate of transparent material in each frame, means for detachably holding the plate in the frame, a perforate top and perforate side walls supported by the floor and frames, said top having an entrance opening at its longitudinal center near one end, perforate partition walls arranged longitudinally of the trap in each side of its longitudinal center and extending from the end adjacent to the entrance opening to near the other end, and thence extending laterally to the side walls of the trap and dividing the trap into a central passage having oppositely extending lateral extensions at the end remote from the entrance opening and a lateral compartment at each side of the central passage, a substantially U-shaped housing arranged transversely of the central passage and connecting the lateral compartments, said housing being on the opposite side of the entrance from the lateral extensions, perforate bait receptacles at the outer end of each lateral extension, a bait receptacle at the top of the trap between the extensions, a cover plate or door for the entrance opening, a shaft journaled transversely of the opening at the end remote from the bait receptacle and to which one end of the door is secured, a gear wheel secured to the shaft, a platform arranged longitudinally of the central passage and extending approximately the full length thereof, a shaft secured transversely of the platform below the first named shaft and upon which the platform may swing, an arm extending radially upward from the shaft, a toothed sector on the arm meshing with the gear wheel for moving the door and the adjacent end of the platform in opposite directions, a passage leading laterally from the passage at the opposite end of the platform to one end of the lateral compartment, and a door hinged at its upper end arranged transversely of the passage, said door inclining downwardly and outwardly and resting at its lower edge on the floor of the passage.

2. A trap comprising a casing having perforate side walls and a perforate top, the top having an entrance opening near one end, transparent plates closing the ends of the casing, means for connecting the plates to the casing, a plurality of bait receptacles near one end and visible through the plate, a door hinged to one end of the entrance opening, a balanced platform pivoted intermediate its ends below the door, the free end of the door normally resting on the platform at one side of the pivotal connection, a connection between the platform and the door for closing the door when the adjacent end of the platform is depressed by the weight of the animal, said connection comprising a gear wheel secured to the door at the hinged connection thereof, an arm extending upwardly from the platform at the pivotal connection thereof, a toothed sector on the arm meshing with the wheel, a perforate wall on each side of the platform extending from the end adjacent to the entrance to near the other end, a lateral wall leading from the inner end of each of said walls to the adjacent side walls, a covered passage way cutting each of the first named walls for connecting the compartments of the trap at the outer sides of the said walls, a passage cutting one of said walls at the level of the platform, and a door closing the said passage and swinging outwardly at its lower end, said door being inclined outwardly toward its bottom and resting on the bottom of the passage.

3. A trap comprising a casing having perforate side walls and a perforate top, the top having an entrance opening near one end, transparent plates closing the ends of the casing, means for connecting the plates to the casing, a plurality of bait receptacles near one end and visible through the plate, a door hinged to one end of the entrance opening, a balanced platform pivoted intermediate its ends below the door, the free end of the door normally resting on the platform at one side of the pivotal connection, a connection between the platform and the door for closing the door when the adjacent end of the platform is depressed by the weight of the animal, a perforate wall on each side of the platform extending from the end adjacent to the entrance to near the other end, a lateral wall leading from the inner end of each of said walls to the adjacent side wall, a covered passage way cutting each of the first named walls for connecting the compartments of the trap at the outer sides of the said walls, a passage cutting one of said walls at the level of the platform, and a door closing the said passage and swinging outwardly at its lower end, said door being inclined outwardly toward its bottom and resting on the bottom of the passage.

4. A trap comprising a casing having perforate side walls and a perforate top, the top having an entrance opening near one end, transparent plates closing the ends of the casing, means for connecting the plates to the casing, a plurality of bait receptacles near one end and visible through the plate, a door hinged to one end of the entrance opening, a balanced platform pivoted intermediate its ends below the door, the free end of the door normally resting on the platform at one side of the pivotal connection, a connection between the platform and the door for closing the door when the adjacent end of the platform is depressed by the weight of the animal, said connection comprising a gear wheel secured to the door at the hinged connection thereof, an arm extending upwardly from the platform at the pivotal connection thereof, a toothed sector on the arm meshing with the wheel, a perforate wall at each side of the platform, said wall dividing the casing into a central passage and lateral compartments, a transverse perforate wall near the end of the trap adjacent to the bait receptacle, the central passage opening through the said wall, a connection between the lateral compartments, and means for permitting the animal to pass from the central passage to one of the lateral compartments and for preventing its return.

5. A trap comprising a casing having a bait receptacle near one end, said casing having an entrance opening near the other end in its top, a door hinged to one end of the opening, a balanced platform below the door, the free edge of the door normally resting on the platform, a connection between the door and the platform for constraining the door to close when the adjacent end of the platform is depressed, said connection comprising a gear wheel secured to the door at the hinged connection thereof, an arm extending upwardly from the platform at the pivotal connection thereof, a toothed sector on the arm meshing with the wheel, a perforate wall on each side of the platform extending from the end adjacent to the entrance to near the other end, a lateral wall leading from the inner end of each of said walls to the adjacent side walls, a covered passage way cutting each of the first named walls for connecting the compartments of the trap at the outer sides of the said walls, a passage cutting one of said walls at the level of the platform, and a door closing the said passage and swinging outwardly at its lower end, said door being inclined outwardly toward its bottom and resting on the bottom of the passage.

WILLIAM A. MAY.

Witnesses:
W. H. HARDEN,
W. R. KNIGHT.

---

Copies of this patent may be obtained for five cents each, by addressing the "Commissioner of Patents, Washington, D. C."